(12) United States Patent
Cho et al.

(10) Patent No.: US 12,070,903 B2
(45) Date of Patent: Aug. 27, 2024

(54) 3D PRINTING APPARATUS AND 3D PRINTING METHOD

(71) Applicant: Samsung Electronics Co., Ltd., Suwon-si (KR)

(72) Inventors: Jungwoo Cho, Hwaseong-si (KR); Minwoo Rhee, Seoul (KR); Hyunjin Lee, Yongin-si (KR); Seungdon Lee, Seongnam-si (KR); Sujie Kang, Gwacheon-si (KR); Sunwoo Park, Hwaseong-si (KR); Kyoungwhan Oh, Hwaseong-si (KR); Jungshin Lee, Hwaseong-si (KR); Juhyung Lee, Cheongju-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/864,738

(22) Filed: Jul. 14, 2022

(65) Prior Publication Data

US 2023/0138834 A1    May 4, 2023

(30) Foreign Application Priority Data

Nov. 3, 2021 (KR) .................. 10-2021-0149876

(51) Int. Cl.
| | | |
|---|---|---|
| *B29C 64/277* | (2017.01) | |
| *B29C 64/112* | (2017.01) | |
| *B29C 64/209* | (2017.01) | |
| *B29C 64/245* | (2017.01) | |
| *B33Y 30/00* | (2015.01) | |

(52) U.S. Cl.
CPC .......... *B29C 64/277* (2017.08); *B29C 64/209* (2017.08); *B29C 64/245* (2017.08); *B33Y 30/00* (2014.12); *B29C 64/112* (2017.08)

(58) Field of Classification Search
CPC ..... B29C 64/20; B29C 64/112; B29C 64/209; B29C 64/245; B29C 64/264; B29C 64/277; B29C 64/393; B33Y 30/00; B33Y 50/02
See application file for complete search history.

(56) References Cited

U.S. PATENT DOCUMENTS

| | | | |
|---|---|---|---|
| 6,550,906 B2 | 4/2003 | Ylitalo | |
| 6,702,438 B2 | 3/2004 | Codos et al. | |
| 8,646,877 B2 | 2/2014 | Thompson et al. | |
| 9,878,561 B2 | 1/2018 | Heath | |
| 2005/0248065 A1* | 11/2005 | Owada ................. | B29C 64/106 264/494 |

(Continued)

FOREIGN PATENT DOCUMENTS

| | | | |
|---|---|---|---|
| EP | 1349733 B1 | 11/2004 | |
| EP | 2419275 B1 | 1/2016 | |

(Continued)

*Primary Examiner* — Jerzi H Moreno Hernandez
(74) *Attorney, Agent, or Firm* — Myers Bigel, P.A.

(57) ABSTRACT

A 3D printing apparatus includes a substrate stage configured to support a substrate, a droplet ejector including at least one droplet nozzle configured to discharge a photocurable droplet on the substrate, a first photo curing unit configured to irradiate light to a drop path along which the droplet discharged from the droplet nozzle falls to change a viscosity of the droplet, and a second photo curing unit configured to irradiate light onto the droplet that has landed on the substrate to cure the droplet.

19 Claims, 13 Drawing Sheets

(56) References Cited

U.S. PATENT DOCUMENTS

| | | | | |
|---|---|---|---|---|
| 2006/0012058 A1* | 1/2006 | Hasei | .................... | B29C 41/36 |
| | | | | 264/1.32 |
| 2012/0225208 A1* | 9/2012 | Tanaka | .................. | B29C 64/112 |
| | | | | 118/712 |
| 2016/0250877 A1* | 9/2016 | Schlatterbeck | ....... | B29C 64/112 |
| | | | | 428/144 |
| 2017/0348903 A1* | 12/2017 | Renn | .................... | B33Y 80/00 |
| 2020/0071432 A1* | 3/2020 | Matsumura | ............. | C08F 20/06 |

FOREIGN PATENT DOCUMENTS

| | | | |
|---|---|---|---|
| EP | 1812241 | B1 | 3/2017 |
| EP | 3131982 | B1 | 2/2021 |
| JP | 2003127338 | A | 5/2003 |
| JP | 2004090245 | A | 3/2004 |
| JP | 2004341167 | A * | 12/2004 |
| JP | 2004341167 | A | 12/2004 |
| JP | 2005022097 | A | 1/2005 |
| JP | 2005138481 | A | 6/2005 |
| JP | 4217882 | B2 | 2/2009 |
| JP | 2015044358 | A | 3/2015 |
| JP | 2015100945 | A * | 6/2015 |
| JP | 6273110 | B2 | 1/2018 |
| KR | 102054110 | B1 | 12/2019 |

\* cited by examiner

3D PRINTING APPARATUS AND 3D PRINTING METHOD

PRIORITY STATEMENT

This application claims priority under 35 U.S.C. § 119 to Korean Patent Application No. 10-2021-0149876, filed on Nov. 3, 2021 in the Korean Intellectual Property Office (KIPO), the contents of which are herein incorporated by reference in their entirety.

FIELD

Example embodiments relate to a three-dimensional printing apparatus and a three-dimensional printing method. More particularly, example embodiments relate to a three-dimensional printing apparatus configured to spray droplets on a substrate and cure them to a desired width, and a three-dimensional printing method using the same.

BACKGROUND

Inkjet printing technology is expandable from conventional coating and selective printing to 3D printing (additive manufacturing). In particular, many attempts have been made to apply it to a semiconductor package field. In order to form a microstructure, after discharging UV curable ink on a substrate, a UV light module may be installed on one side of an inkjet head to irradiate light to cure the ink. However, since the ink is exposed to light while the ink is spread on the substrate due to mechanical limitations of the inkjet head, it is difficult to reduce a size of the microstructure.

SUMMARY

Example embodiments provide a 3D printing apparatus capable of forming a microstructure having a desired size.

Example embodiments provide a 3D printing method using the 3D printing apparatus.

According to example embodiments, a 3D printing apparatus includes a substrate stage configured to support a substrate, a droplet ejector including at least one droplet nozzle configured to discharge a photo-curable droplet on the substrate, a first photo curing unit configured to irradiate light to a drop path along which the droplet discharged from the droplet nozzle falls to change a viscosity of the droplet, and a second photo curing unit configured to irradiate light onto the droplet that has landed on the substrate to cure the droplet.

According to example embodiments, a 3D printing apparatus includes a substrate stage configured to support a substrate, an inkjet head including at least one droplet nozzle configured to discharge an ultraviolet (UV)-curable droplet on the substrate, a first UV irradiator configured to irradiate UV light in a horizontal direction to a drop path along which the droplet discharged from the droplet nozzle falls to change a viscosity of the droplet, a second UV irradiator configured to irradiate UV light onto the droplet that has landed on the substrate to cure the droplet, and a controller configured to control an irradiation timing of the UV light emitted from the first UV irradiator based on an ejection signal of the droplet ejected from the droplet nozzle.

According to example embodiments, a 3D printing apparatus includes a substrate stage configured to support a substrate, a droplet ejector comprising at least one droplet nozzle configured to discharge a photo-curable droplet on the substrate, a first photo curing unit configured to irradiate light to a drop path along which the droplet discharged from the droplet nozzle falls, to change a viscosity of the droplet, and a second photo curing unit configured to irradiate light onto the droplet that has landed on the substrate, to cure the droplet. The first photo curing unit is configured to irradiate the light to different sides of the droplet falling along the drop path.

According to example embodiments, in a 3D printing method, a substrate is positioned on a substrate stage. A photo-curable droplet is discharged on a target area of the substrate through at least one droplet nozzle. Light is firstly irradiated to the droplet falling along a drop path to change a viscosity of the droplet. Light is secondarily irradiated onto the droplet that has landed on the substrate to cure the droplet.

BRIEF DESCRIPTION OF THE DRAWINGS

Example embodiments will be more clearly understood from the following detailed description taken in conjunction with the accompanying drawings.

FIG. 1 is a block diagram illustrating a three-dimensional printing apparatus in accordance with example embodiments.

FIG. 2 is a cross-sectional view illustrating a distance between a droplet nozzle and a substrate and a distance between the droplet nozzle and a second light irradiator in FIG. 1.

FIG. 3 is a plan view illustrating a droplet ejector in FIG. 1.

FIG. 4 is a cross-sectional view illustrating a first photo curing unit in accordance with example embodiments.

FIG. 5 is a cross-sectional view taken along the line A-A' in FIG. 4.

FIG. 6 is a cross-sectional view taken along the line B-B' in FIG. 4.

FIG. 7 is a cross-sectional view illustrating an input portion of an optical fiber module in accordance with example embodiments.

FIGS. 8 and 9 are cross-sectional views illustrating a portion of an output portion of an optical fiber module in accordance with example embodiments.

FIG. 10 is a plan view illustrating a light emitting portion of a first photo curing unit in accordance with example embodiments.

FIG. 11 is a perspective view illustrating a portion of the light emitting portion in FIG. 10.

FIG. 12 is a plan view illustrating a light emitting portion of a first photo curing unit in accordance with example embodiments.

FIG. 13 is a block diagram illustrating a controller of the 3D printing apparatus of FIG. 1.

FIG. 14 is a cross-sectional view illustrating a first photo curing unit that irradiates light to a droplet discharged from a droplet nozzle.

FIG. 15 is a cross-sectional view illustrating a second photo curing unit that irradiates light onto a droplet that has landed on a wafer.

FIG. 16 is a plan view illustrating a microstructure formed on the wafer in FIG. 15.

FIG. 17 is a cross-sectional view illustrating a first photo curing unit that irradiates light to droplets discharged from a plurality of droplet nozzles in accordance with example embodiments.

FIG. 18 is a cross-sectional view illustrating a microstructure formed on a wafer in accordance with example embodiments.

FIG. 19 is a flowchart illustrating a 3D printing method in accordance with example embodiments.

DETAILED DESCRIPTION

Hereinafter, example embodiments will be explained in detail with reference to the accompanying drawings.

Figure 1:
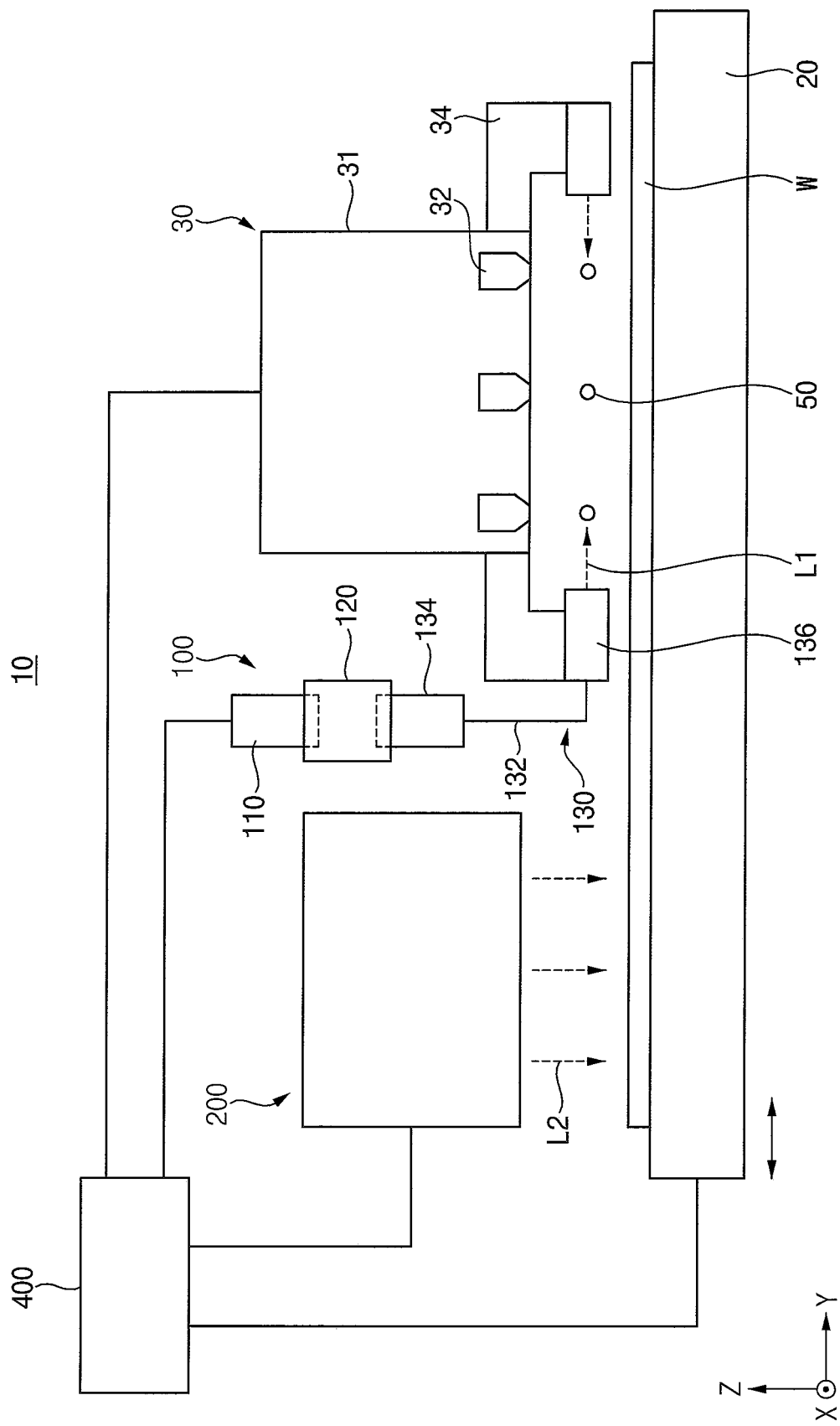
FIGS. 1 to 19 represent non-limiting, example embodiments as described herein.
Figure 2:
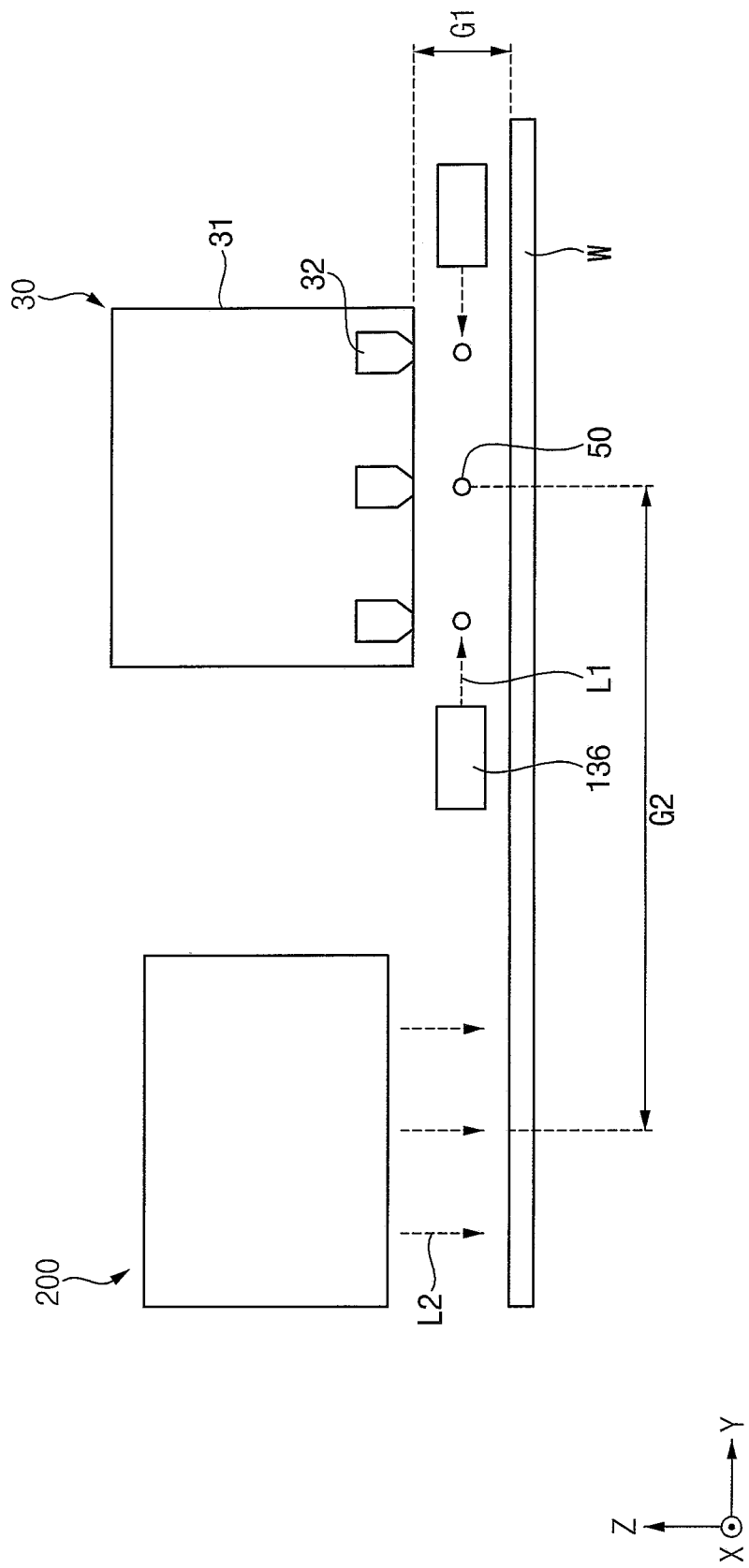
Figure 3:
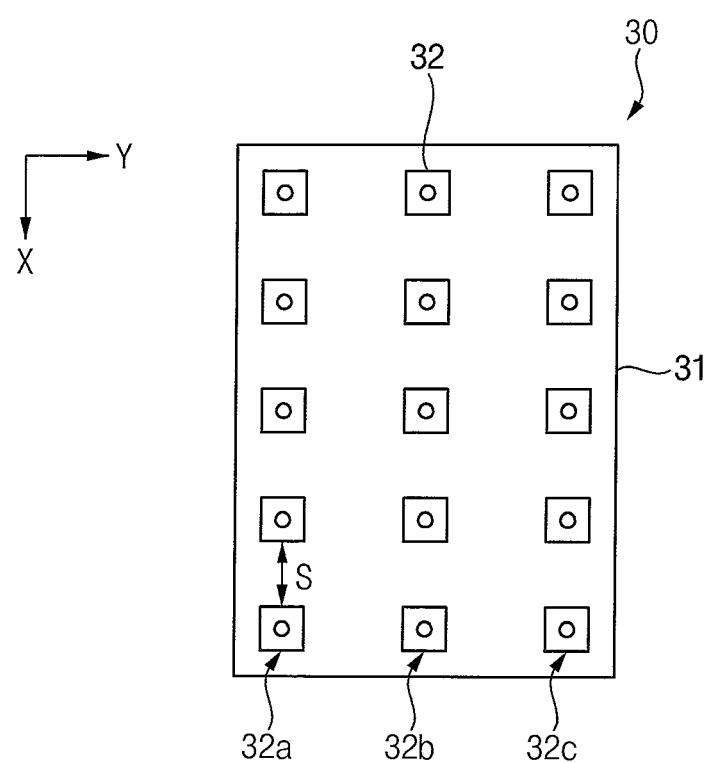

FIG. 1 is a block diagram illustrating a three-dimensional printing apparatus in accordance with example embodiments. FIG. 2 is a cross-sectional view illustrating a distance between a droplet nozzle and a substrate and a distance between the droplet nozzle and a second light irradiator in FIG. 1. FIG. 3 is a plan view illustrating a droplet ejector in FIG. 1.

Referring to FIGS. 1 to 3, a three-dimensional printing apparatus 10 may include a substrate stage 20 configured to support a substrate such as a wafer W, a droplet ejector 30 installed over the substrate stage 20 to eject droplets having photo-curability on the substrate, a first photo curing unit or first photo curing system 100 configured to change physical properties of the droplet by firstly irradiating light onto the droplet ejected from the droplet ejector 30, and a second photo curing unit or second photo curing system 200 configured to cure the droplet by secondarily irradiating light on the droplet that has landed on the substrate. In addition, the three-dimensional printing apparatus 10 may further include a controller 400 configured to control operations of the substrate stage 20, the droplet ejector 30, the first photo curing unit 100 and the second photo curing unit 200.

In example embodiments, the three-dimensional printing apparatus 10 may spray droplets on the substrate such as the wafer W and curing it to have a desired width in order to manufacture a three-dimensional structure. The three-dimensional printing apparatus 10 may include an inkjet printing apparatus for 3D printing.

For example, the three-dimensional printing apparatus 10 may be used to form fine structures such as support spacers that are disposed in a peripheral region of a memory die between vertically stacked memory dies (chips), such as a high bandwidth memory (HBM) device. Additionally, the three-dimensional printing apparatus 10 may be used to form a fine structure such as a dam structure that is disposed on one surface of a redistribution wiring layer of a panel level package. The dam structure may be provided around each of electrodes of a capacitor that are exposed on one surface of the redistribution wiring layer to protect them from the outside. The capacitor may include a land-side capacitor (LSC) type capacitor.

In example embodiments, the substrate stage 20 may support the wafer W on which the droplet lands. The three-dimensional printing apparatus 10 may include at least one driver configured to move the substrate stage 20 and the droplet ejector 30 relative to each other. For example, the driver may move the substrate stage 20 in a first direction (X direction) and move the droplet ejector 30 in a second direction (Y direction) perpendicular to the first direction. Additionally, the driver may move the second photo curing unit 200 in the first direction (X direction) or the second direction (Y direction).

The controller 400 may output a driving pulse signal to the driver to move the wafer W in the first direction (X direction) and move the droplet ejector 30 in the second direction (Y direction), and as will be described below, may control operations of the first photo curing unit 100 and the second photo curing unit 200 to be in synchronization with a jetting trigger signal of the droplet ejector 30. Accordingly, the substrate stage 20 may move relative to each of the droplet ejector 30 and the second photo curing unit 200. Thus, the droplet ejector 30 may eject a droplet at a desired position on the wafer W, and the second photo curing unit 200 may irradiate light onto the droplet that has impacted the wafer W to cure the droplet.

In example embodiments, the droplet ejector 30 may include at least one droplet nozzle 32 as a droplet discharger that ejects a photo-curable droplet 50 on the wafer W. For example, the droplet ejector 30 may include an inkjet head. Alternatively, the droplet ejector may include a dispenser.

When the droplet ejector 30 includes an inkjet head, since it is easy to control the discharge amount of the droplet 50 and the droplet 50 can reach a fine area, there is an advantage that a fine structure can be formed in a desired shape and size. Hereinafter, a case in which an inkjet head is used as the droplet ejector will be described.

The droplet ejector 30 may include a liquid supply unit configured to supply a photo-curable liquid, the droplet nozzle 32 configured to eject the liquid from the liquid supply unit into droplets having predetermined diameters, and a piezoelectric element configured to drive the droplet nozzle 32. The inkjet head driver may output a control signal such as a trigger signal to the piezoelectric element, and the piezoelectric element may modulate the pressure inside the droplet nozzle 32 in response to the trigger signal to eject the droplet 50. The inkjet head driver may be controlled by a droplet control portion or module of the controller 400, and the injection timing, diameter, and exit speed of the droplets from the droplet nozzle 32 may be adjusted according to the control signal of the controller 400.

For example, a diameter of the droplet nozzle 32 may be within a range of 15 μm to 40 μm. The liquid may include an ultraviolet (UV) curable resin. In this case, the first photo curing unit 100 may serve as a first UV irradiator, and the second photo curing unit 200 may serve as a second UV irradiator. Although in the drawings, the droplet ejector is illustrated as including the droplet nozzle having a nozzle shape, is not limited thereto, and the droplet nozzle may have a hole shape.

The droplet ejector 30 may include at least one inkjet head block 31 provided with droplet nozzles 32 installed therein. The droplet nozzles 32 may be arranged in an array shape at predetermined intervals. For example, a length of the inkjet head block 31 may be within a range of 60 cm to 80 cm, and a width of the inkjet head block 31 may be within a range of 30 cm to 40 cm. The inkjet head block 31 may include tens to thousands of droplet nozzles 32. The droplet nozzles 32 may be installed in the inkjet head block 31 to be arranged in one row, two rows, three rows or four rows, for example.

As illustrated in FIG. 3, in the inkjet head block 31, first to third nozzle arrays 32a, 32b and 32c may be arranged in the second direction (Y direction) perpendicular to the first direction (X direction). Each of the first to third nozzle arrays 32a, 32b and 32c may include droplet nozzles 32 that are arranged to be spaced apart from each other by a predetermined interval or spacing S along the first direction (X direction). For example, the spacing distance between the droplet nozzles 32 adjacent to each other may be within a range of 100 μm to 150 μm. The first to third nozzle arrays 32a, 32b and 32c may simultaneously or sequentially eject the droplets 50 in response to ink ejection signals (trigger signals).

As illustrated in FIG. 2, a gap G1 between the droplet nozzle 32 of the droplet ejector 30 and the wafer W may be within a range of 1 mm to 2 mm. The first to third nozzle arrays 32a, 32b and 32c may respectively eject the droplets 50 onto first to third regions on the wafer W that are spaced apart from each other at regular intervals. The ejected droplets 50 may each fall on the wafer W after falling along a drop path.

In example embodiments, the first photo curing unit 100 may irradiate light onto the drop path of the droplet 50 discharged from the droplet nozzle 32 to change the physical properties of the droplet (primary curing). The first photo curing unit 100 may irradiate light to the droplet 50 before the droplet 50 impacts the wafer W. The first photo curing unit 100 may irradiate light in a horizontal direction perpendicular to the vertical direction (Z direction) toward the droplet 50 falling in the vertical direction (Z direction). The first photo curing unit 100 may include optical elements for irradiating ultraviolet light.

As will be described below, the first photo curing unit 100 may include a plurality of optical fibers for directing the light from the ultraviolet light source toward the drop path. Output terminals of the optical fibers as a light emitting portion 136 of the first photo curing unit 100 may be disposed between the droplet nozzle 32 and the wafer W to emit ultraviolet light in the horizontal direction toward the droplet 50 falling along the drop path. The light emitting portion 136 of the first photo curing unit 100 may be installed in or on a flange 34 fixed to a lower portion of the inkjet head block 31. The light emitting portion 136 may be installed under the flange 34 to irradiate the ultraviolet light in the horizontal direction toward the droplet 50 falling along the drop path between the droplet nozzle 32 and the wafer W.

The light emitting portion 136 may irradiate the ultraviolet light in the horizontal direction or in a direction inclined downward by a predetermined angle with respect to the horizontal direction. An angle adjusting mechanism may be installed inside or on the flange 34 or the light emitting portion 136 to adjust an angle of the light emitted from the light emitting portion 136.

Since the liquid used in the inkjet head has a relatively low viscosity, it can spread very well on the surface of the wafer W after it lands on the wafer W having a hydrophilic surface. The first photo curing unit 100 may firstly curing the droplet 50 having a low viscosity before landing on the wafer W to increase the viscosity of the droplet 50. Accordingly, by reducing the spread of the droplet 50 on the wafer W, it may be possible to form a fine structure having a relatively narrow line width.

In example embodiments, the second photo curing unit 200 may irradiate light onto the droplet 50 that has landed on the wafer W to cure the droplet (secondary curing). The second photo curing unit 200 may irradiate light in the vertical direction (Z direction) toward the droplet 50 that has landed on the wafer W. The second photo curing unit 200 may include a UV head that is installed to be spaced apart from the inkjet head block 31 in the horizontal direction to irradiate ultraviolet light.

For example, a gap G2 between the droplet nozzle 32 of the droplet ejector 30 and a light irradiator of the second photo curing unit 200 may be at least 60 mm. After the droplet 50 ejected from the droplet nozzle 32 lands on the wafer W, the wafer W may be moved under the second photo curing unit 200 by the stage driver, and then, the second photo curing unit 200 may irradiate light onto the droplet on the wafer W under the second photo curing unit 200. In this case, after about 300 ms after discharging the droplet, the second photo curing unit 200 may irradiate the droplet with light.

Hereinafter, the first photo curing unit will be described in detail.

Figure 4:
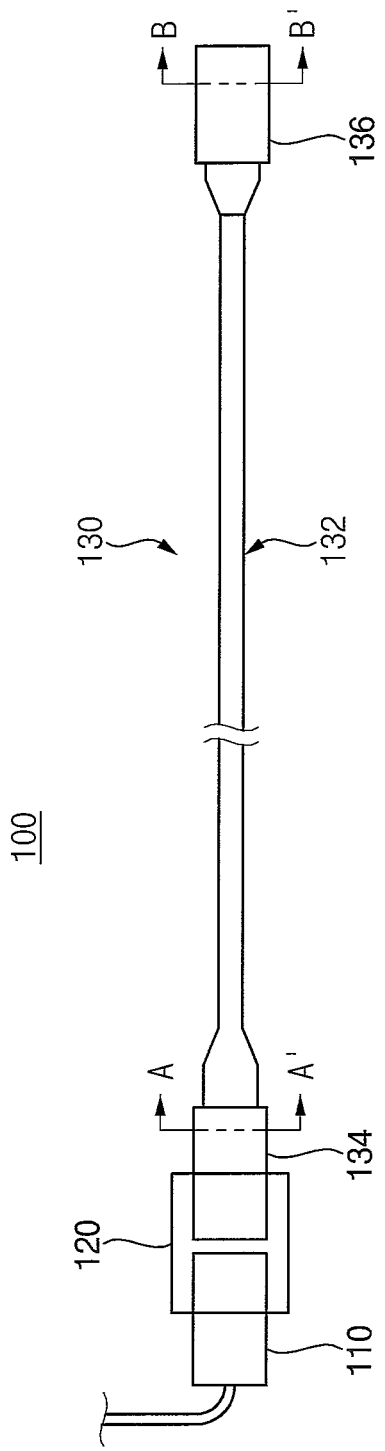
Figure 5:
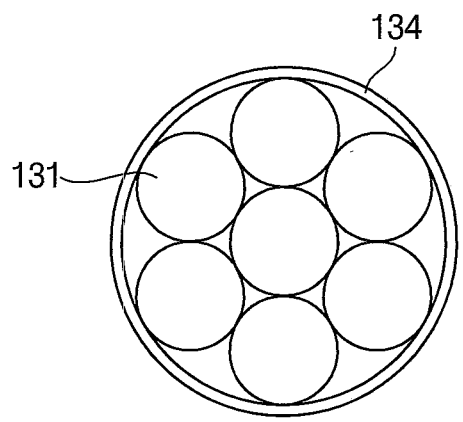
Figure 6:
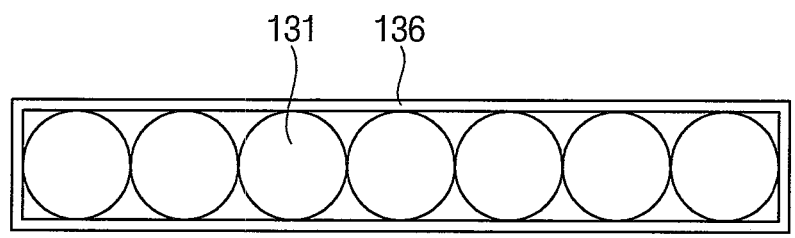

FIG. 4 is a cross-sectional view illustrating a first photo curing unit in accordance with example embodiments. FIG. 5 is a cross-sectional view taken along the line A-A' in FIG. 4. FIG. 6 is a cross-sectional view taken along the line B-B' in FIG. 4.

Referring to FIGS. 4 to 6, a first photo curing unit 100 may include a light source 110 to generate light and include an optical fiber module 130 having a plurality of optical fibers 131 configured to direct light from the light source 110 toward a droplet 50 between a droplet nozzle 32 and a wafer W. The first photo curing unit 100 may further include a clamp 120 connecting the light source 110 and the optical fiber module 130.

The light source 110 may include an ultraviolet light source, a laser light source, etc., e.g., as a UV head. The light generated by the light source 110 may be determined or selected according to the material of the droplet 50 to be cured.

The optical fiber module 130 may include a cable 132 accommodating the optical fibers 131, an input portion 134 and an output portion 136. The input portion 134 of the optical fiber module 130 may be connected to the light source 110 by the clamp 120. The clamp 120 may align the UV head with an optical axis of the optical fiber module 130. For example, a diameter of the optical fiber 131 may be 600 μm or less.

A plurality of the optical fibers 131 may be accommodated within the cable 132, and light from the light source 110 may be inputted through input terminals of the optical fibers 131 and outputted through output terminals of the optical fibers 131. The input portion 134 of the optical fiber module 130 may have a circular cross-sectional shape in order to minimize light loss, and the output portion 136 of the optical fiber module 130 may have a rectangular cross-sectional shape extending in one direction in consideration of the positions or the like of the droplets 50 discharged from a plurality of droplet nozzles 32. Since the cross-sectional shape of the output portion 136 of the optical fiber module 130 can have various shapes, the light output from the output portion 136 may be formed to have a desired shape.

Since the cable 132 of the optical fiber module 130 has flexibility, the output portion 136 of the optical fiber module 130 may be installed at a desired position. As illustrated in FIG. 1, the output portion 136 of the optical fiber module 130 as a light emitting portion of the first photo curing unit 100 may be fixedly installed in a lower portion of the inkjet head block 31 by the flange 34. Accordingly, the output portion 136 of the optical fiber module 130 may be arranged between the droplet nozzle 32 and the wafer W to irradiate the ultraviolet light in the horizontal direction toward the droplet 50 falling along the drop path.

The irradiation time, power (output), intensity of illumination, light emission channel, etc. of the light emitted by the first photo curing unit 100 may be controlled by a light controller of the controller 400. As will be described below, the power of the light may be determined according to the material of the droplet that strikes the wafer W.

The injection timing, diameter, and exit speed of the droplets from the droplet nozzle 32 may adjust according to the control signal of the controller 400.

Figure 7:
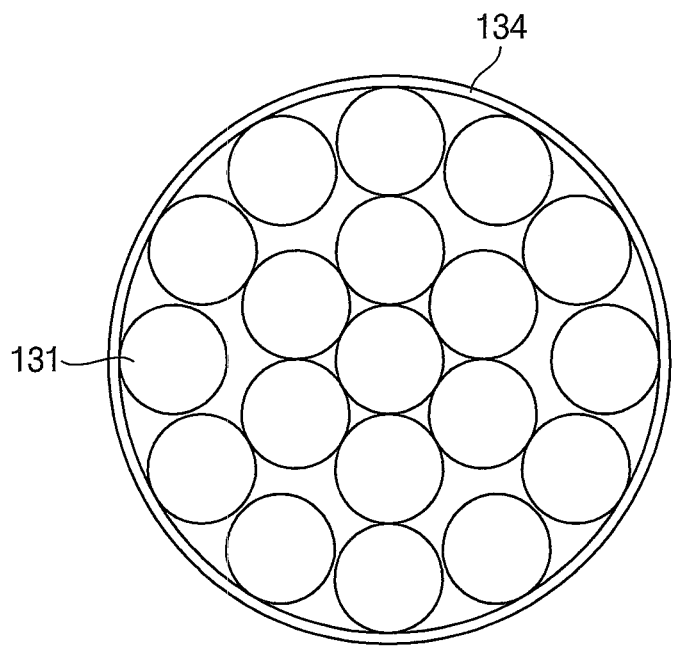
Figure 8:
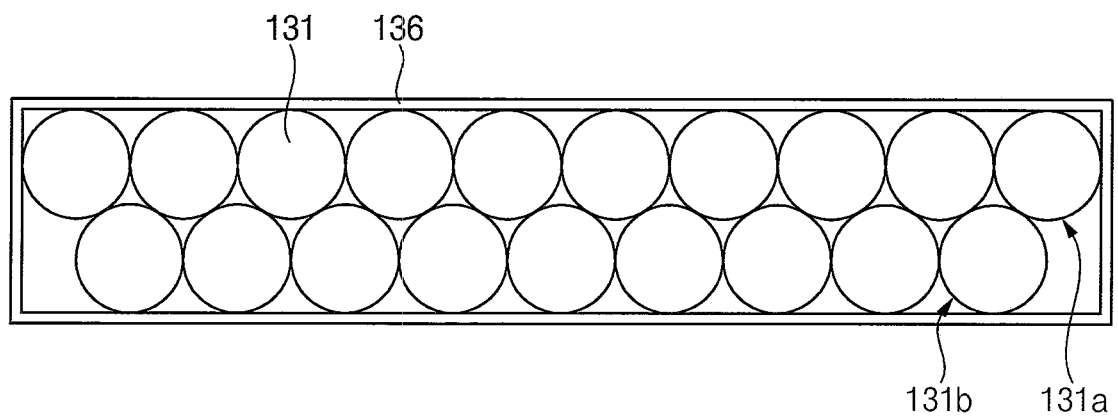
Figure 9:
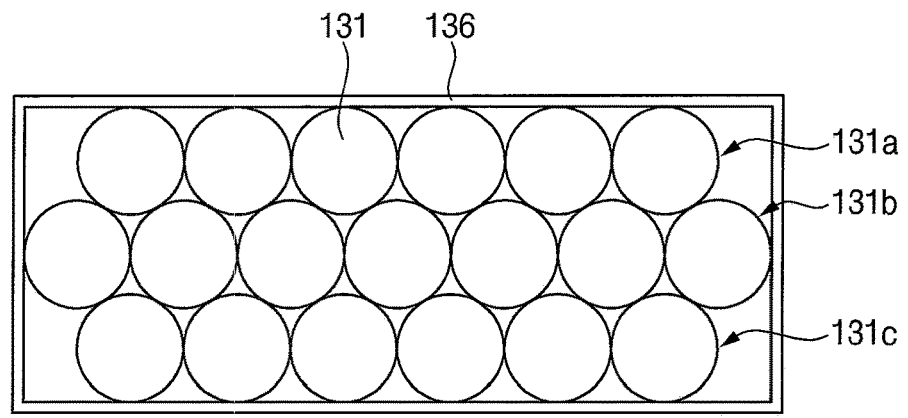

FIG. 7 is a cross-sectional view illustrating an input portion of an optical fiber module in accordance with example embodiments. FIGS. 8 and 9 are cross-sectional views illustrating a portion of an output portion of an optical fiber module in accordance with example embodiments. FIG. 7 is a cross-sectional view taken along the line A-A' in FIG. 4. FIGS. 8 and 9 are cross-sectional views taken along the line B-B' in FIG. 4.

Referring to FIGS. 7 to 9, the number of optical fibers 131 may be changed, and output terminals of the optical fibers 131 in an output portion 136 of an optical fiber module 130 may be arranged in an array form.

As illustrated in FIG. 8, the output portion 136 of the optical fiber module 130 as a light emitting portion of a first photo curing unit 100 may include first and second light emission channels 131a and 131b arranged in a vertical direction (Z direction). Some of the output terminals of the optical fibers 131 may be arranged in one row to provide the first light emission channel 131a. Some of the output terminals of the optical fibers 131 may be arranged in two rows to provide the second light emission channel 131b. The first light emission channel 131a may irradiate light to the droplet 50 at a first height from the wafer W. The second light emission channel 131b may radiate light to the droplet 50 at a second height lower than the first height from the wafer W.

As illustrated in FIG. 9, the output portion 136 of the optical fiber module 130 as the light emitting portion of the first photo curing unit 100 may include first, second and third light emission channels 131a, 131b and 131c arranged in the vertical direction (Z direction). The first light emission channel 131a may irradiate light to the droplet 50 at a first height from the wafer W. The second light emission channel 131b may radiate light to the droplet 50 at a second height lower than the first height from the wafer W. The third light emission channel 131c may radiate light to the droplet 50 at a third height lower than the second height from the wafer W.

Figure 10:
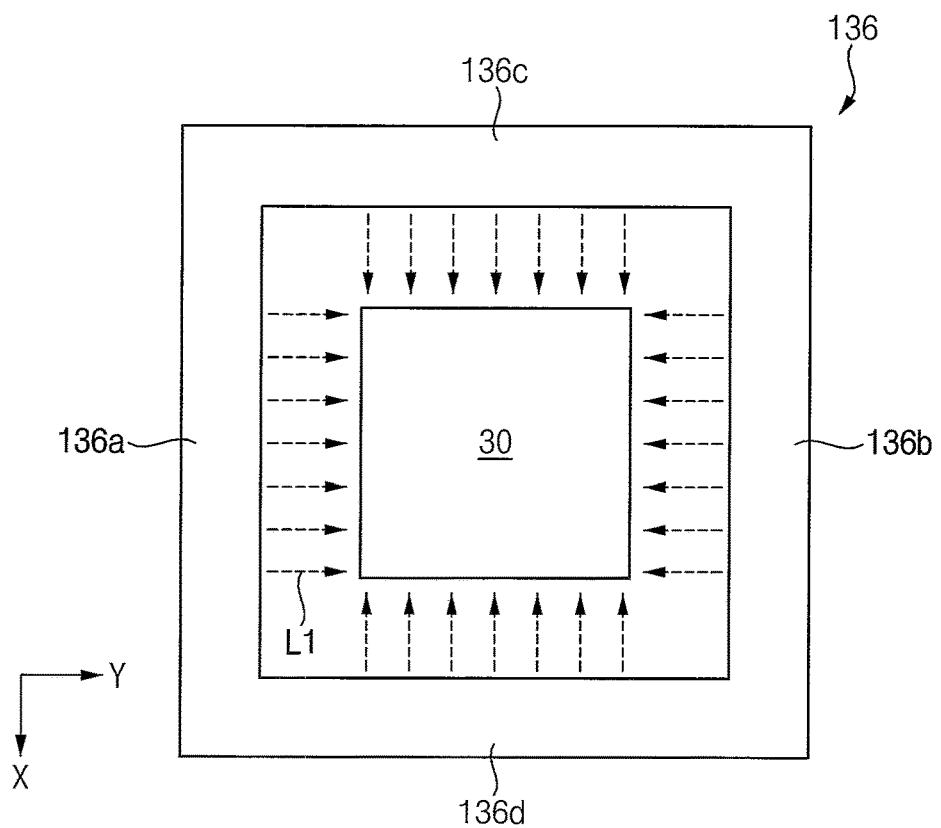
Figure 11:
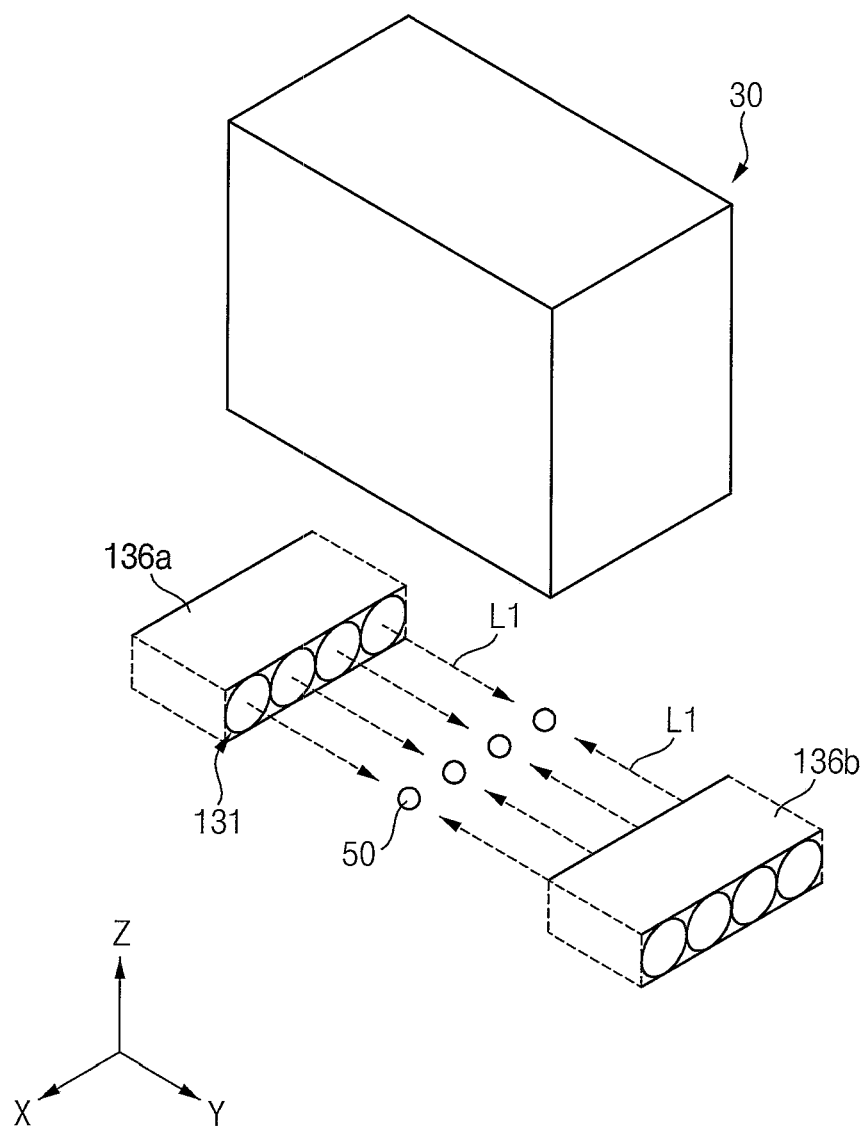

FIG. 10 is a plan view illustrating a light emitting portion of a first photo curing unit in accordance with example embodiments. FIG. 11 is a perspective view illustrating a portion of the light emitting portion in FIG. 10.

Referring to FIGS. 10 and 11, an output portion 136 of an optical fiber module 130 as a light emitting portion of a first photo curing unit 100 may have a polygonal shape such as a rectangular shape extending to surround the droplet ejector 30 or the droplet nozzle 32 when viewed in plan view. Output terminals of the optical fibers 131 may be separated from each other to provide the output portion 136 having the rectangular shape. Accordingly, the output portion 136 may irradiate light to different sides of the droplet 50 discharged from a droplet nozzle 32 to increase the amount of light.

For example, the output portion 136 and may include first and second emitting portions 136a and 136b extending in a direction parallel with a first direction (X direction) and facing each other, and third and fourth emitting portions 136c and 136d extending in a direction parallel with a second direction (Y direction) and facing each other. Only some of the first to fourth emitting portions 136a, 136b, 136c and 136d may be selectively operated to emit light.

Figure 12:
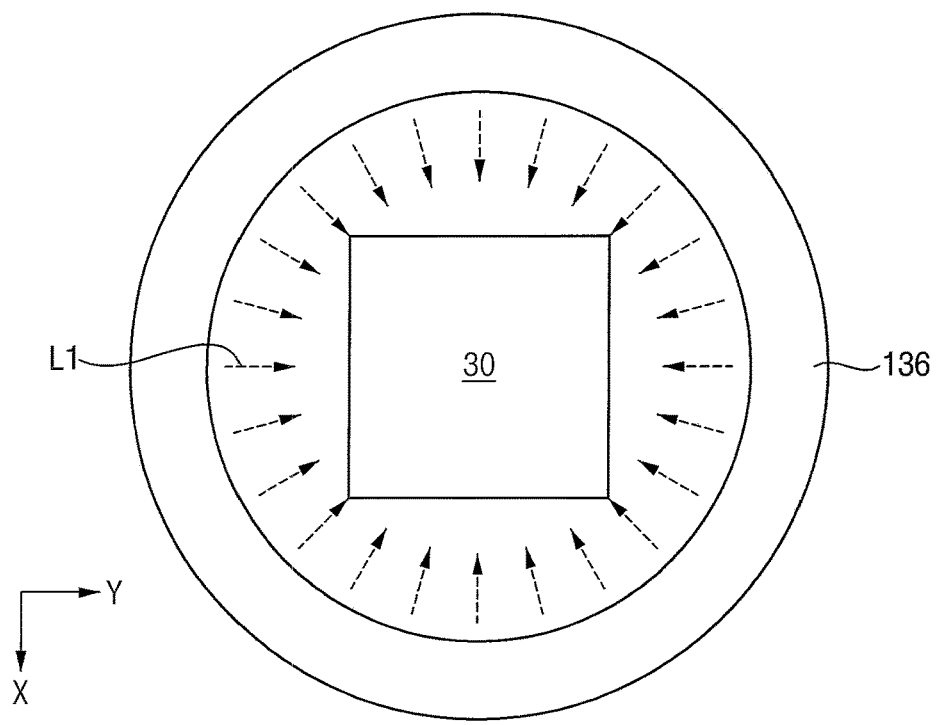

FIG. 12 is a plan view illustrating a light emitting portion of a first photo curing unit in accordance with example embodiments.

Referring to FIG. 12, an output portion 136 of an optical fiber module 130 may have an annular or ring shape extending to surround the droplet ejector 30 or the droplet nozzle 32 when viewed in plan view. Output terminals of the optical fibers 131 may be separated from each other to provide the output portion 136 having the annular shape. Accordingly, the output portion 136 may irradiate light to different sides of the droplet 50 discharged from the droplet nozzle 32.

Hereinafter, a method of controlling the 3D printing apparatus will be explained.

Figure 13:
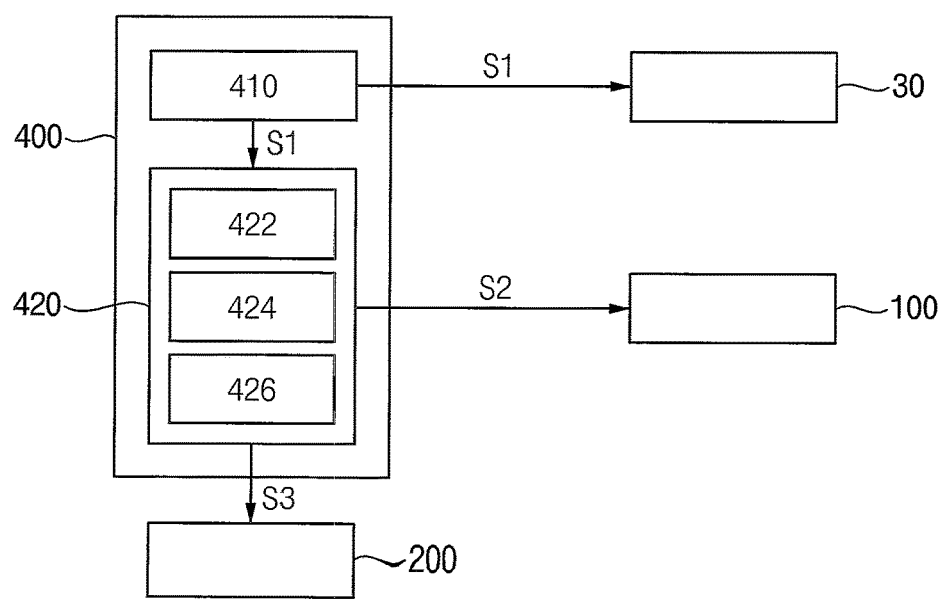

FIG. 13 is a block diagram illustrating a controller of the 3D printing apparatus of FIG. 1.

Referring to FIG. 13, a controller 400 may include a droplet controller 410 configured to control an operation of a droplet ejector 30 and a light controller 420 configured to control operations of first and second photo curing units 100 and 200. Additionally, the controller 400 may further include a stage controller configured to control an operation of a substrate stage 20.

In example embodiments, the droplet controller 410 may control operations of the droplet nozzles 32 of the droplet ejector 30. The droplet controller 410 may output a control signal S1 such as a trigger signal to an inkjet head driver of the droplet ejector 30. The piezoelectric element of the droplet ejector 30 may eject the droplet 50 by modulating the pressure inside the droplet nozzle 32 in response to the trigger signal. Additionally, the droplet controller 410 may control the injection timing, diameter, and exit speed of the droplets from the droplet nozzle 32.

The light controller 420 may control the operations of the first and second photo curing units 100 and 200. The light controller 420 may control the irradiation timing, power, intensity of illumination, optical fiber channel, etc. of the light emitted by the first photo curing unit 100. The light controller 420 may control the irradiation timing, power, intensity of illumination, etc. of the light emitted by the second photo curing unit 200.

In particular, the light controller 420 may include an irradiation timing controller 422, a power controller 424 and a light emission channel selector 426.

The irradiation timing controller 422 may receive a first control signal S1 including the trigger signal from the droplet controller 410 (or the inkjet head driver), and may determine a time delay from ejection of droplets to irradiation of light, that is, light irradiation time point (light irradiation time point (μs~ms)), based on the trigger signal generation time.

The power controller 424 may determine the power (0 to 100%) of the light generated from the light source 110 based on the first control signal S1. The power of the light may be determined in consideration of a material of the droplet, a rate of change in viscosity, etc.

The light emission channel selector 426 may select at least one of the light emitting channels arranged in the vertical direction in the output portion 136 of the optical fiber module 130. The light emission channel may be determined in consideration of a time point at which light is irradiated after droplet discharge (height from the substrate).

The light controller 420 may output a second control signal S2 according to the parameters determined by the irradiation timing controller 422, the power controller 424 and the light emission channel selector 426 to the first photo curing unit 100, and the first photo curing unit 100 may irradiate light to the droplet 50 based on the second control signal S2.

Similarly, the light controller 420 may output a third control signal S3 to the second photo curing unit 200, and the second photo curing unit 200 may irradiate light onto the droplet that has landed on the wafer W based on the third control signal S3.

Figure 14:
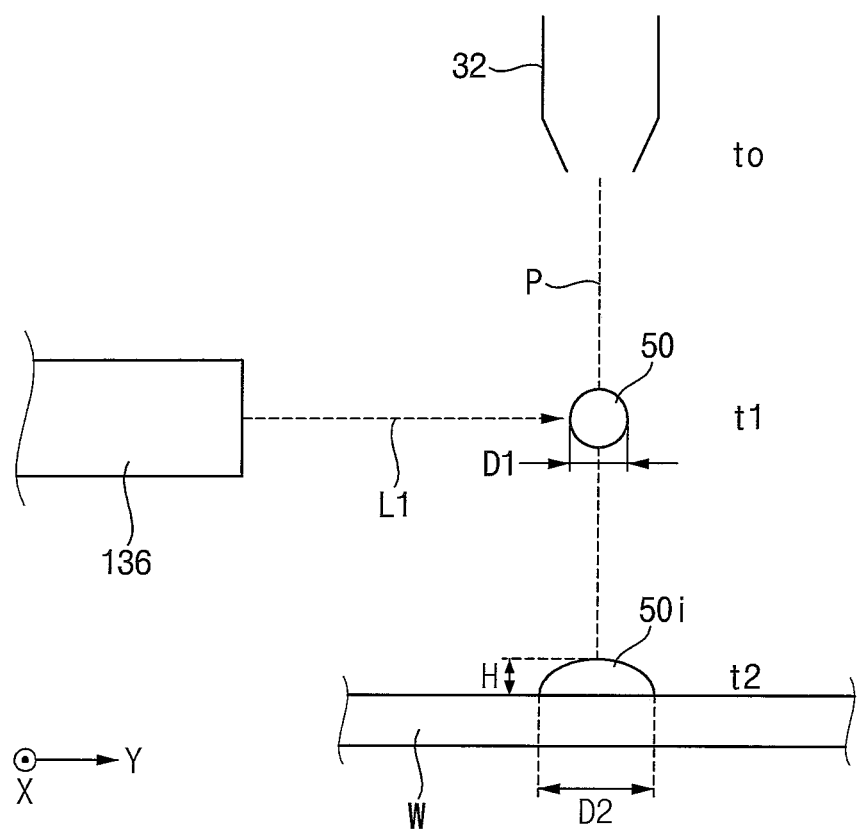
Figure 15:
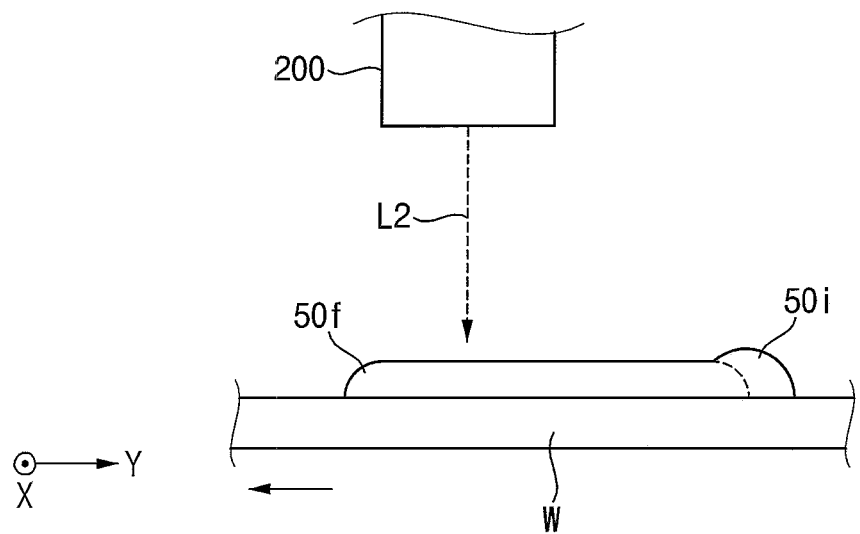
Figure 16:
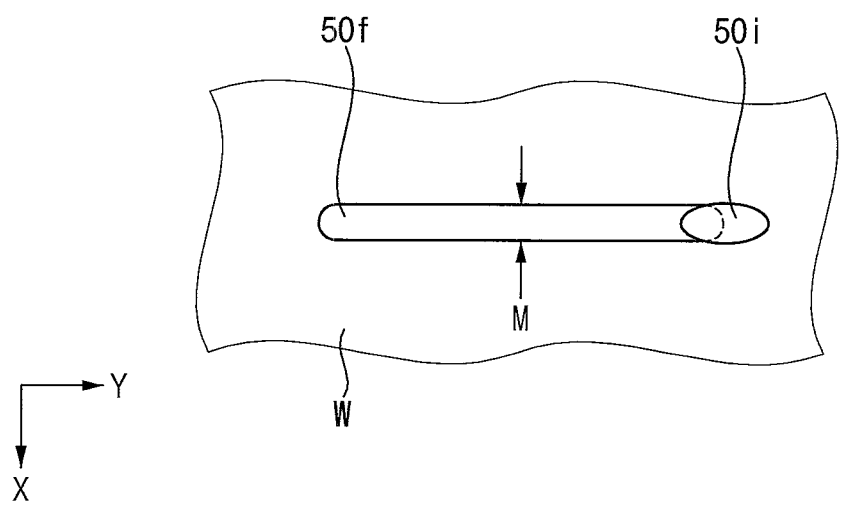

FIG. 14 is a cross-sectional view illustrating a first photo curing unit that irradiates light to a droplet discharged from a droplet nozzle. FIG. 15 is a cross-sectional view illustrating a second photo curing unit that irradiates light onto a droplet that has landed on a wafer. FIG. 16 is a plan view illustrating a microstructure formed on the wafer in FIG. 15.

Referring to FIG. 14, a droplet 50 discharged from a droplet nozzle 32 may fall along a drop path P and then land on a wafer W. A light output portion 136 of a first photo curing unit 100 may irradiate light L1 in a horizontal direction toward the droplet 50 that is falling along the drop path P between the droplet nozzle 32 and the wafer W before the droplet 50 hits the wafer W.

When a first time t1 has elapsed from a discharge time t0, the light output portion 136 of the first photo curing unit 100 may irradiate the droplet 50 with light. At this time, a diameter of the droplet 50 may be within a range of 15 μm to 40 μm. As light is irradiated to the droplet 50, a physical property of the droplet 50, that is, viscosity may increase. The rate of change in viscosity of the droplet 50 may be determined by the power (output) of light.

Then, the droplet 50 having the viscosity increased by the light irradiation may land on a target area of the wafer W at a time point when a second time t2 has elapsed from the discharge time t0. The droplet 50$i$ that has landed on the wafer W may spread on the surface of the wafer W. The spread of the impacted droplet 50$i$ may be reduced by the increased viscosity so that the impacted droplet has a relatively small diameter D2. For example, the diameter D2 of the impacted droplet 50$i$ may be 50 μm or less. A height H of the impacted droplet 50$i$ may be 1 μm or less.

Referring to FIGS. 15 and 16, while the wafer W moves in one direction, the droplet nozzle 32 may discharge the droplets 50 according to a pulse signal, thereby forming a microstructure having a constant width M.

After the droplet 50 discharged from the droplet nozzle 32 lands on the wafer W, the wafer W may move under a second photo curing unit 200 by a stage driver and the second photo curing unit 200 may irradiate light L2 to the droplet 50$i$ that has landed on the wafer W. Accordingly, the impacted droplet 50$i$ may be changed into a droplet 50$f$ cured by light to form the microstructure. The microstructure may have a width M of 50 μm or less.

Since the droplet 50 discharged from the droplet nozzle 32 and falling is primarily cured by the first photo curing unit, the time required to be completely cured by the second photo curing unit 200 may be shortened.

Figure 17:
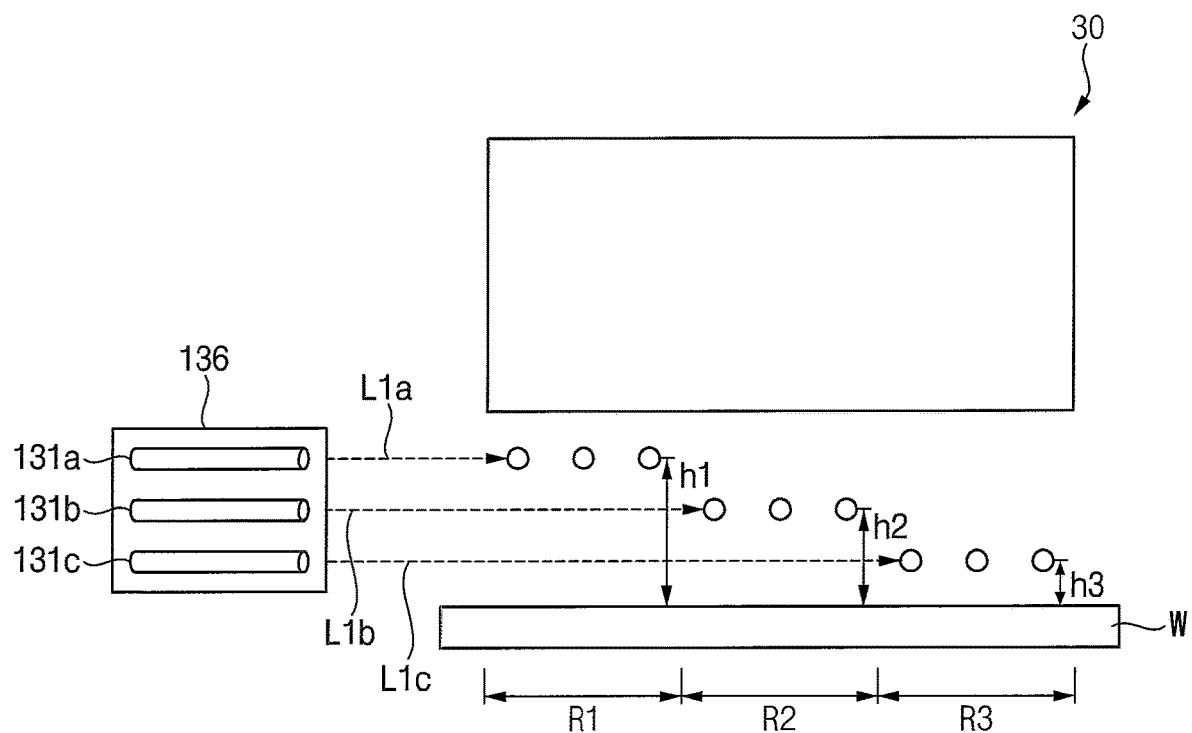

FIG. 17 is a cross-sectional view illustrating a first photo curing unit that irradiates light to droplets discharged from a plurality of droplet nozzles in accordance with example embodiments.

Referring to FIG. 17, in example embodiments, an output portion 136 of an optical fiber module as a light emitting portion of a first photo curing unit may include first to third light emission channels 131$a$, 131$b$ and 131$c$ arranged in a vertical direction (Z direction). Each of the first to third light output channels 131$a$, 131$b$ and 131$c$ may include portions of output terminals of optical fibers 131.

A plurality of droplet nozzles of a droplet ejector 30 may eject droplets 50 to a first target area R1 on a wafer W respectively, and the first light emission channel 131$a$ may irradiate light L1$a$ toward the droplets 50 at first height h1 from the wafer W. A plurality of droplet nozzles of the droplet ejector 30 may eject droplets 50 to a second target region R2 on the wafer W respectively, and the second light emission channel 131$b$ may irradiate light L1$b$ toward the droplets 50 at a second height h2 from the wafer W. A plurality of droplet nozzles of the droplet ejector 30 may eject droplets 50 to a third target region R3 on the wafer W respectively, and the third light emission channel 131$c$ may irradiate light L1$c$ toward the droplets 50 at a third height h3 from the wafer W. An irradiation timing, output, etc. of the light irradiated from the first to third light emission channels 131$a$, 132$b$ and 131$c$ may be controlled by a light controller.

Figure 18:
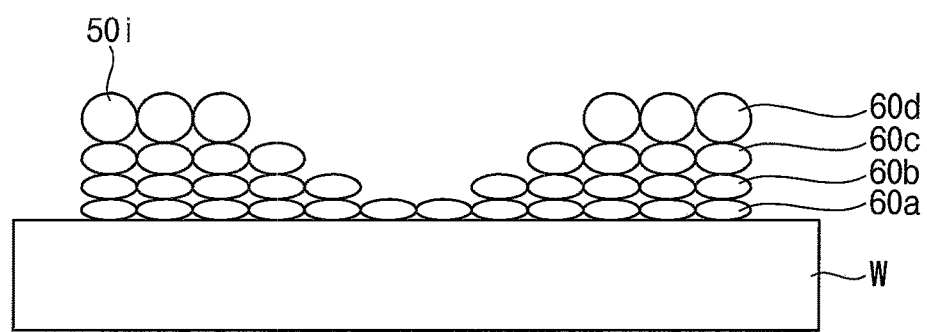

FIG. 18 is a cross-sectional view illustrating a microstructure formed on a wafer in accordance with example embodiments.

FIGS. 1 and 18, a three-dimensional printing apparatus 10 may sequentially forms a plurality of stacked layers 60$a$, 60$b$, 60$c$ and 60$d$ on a wafer W to form a desired three-dimensional microstructure.

First, a droplet ejector 30 of the 3D printing apparatus 10 may discharge first droplets having a first photo-curable material on a surface of the wafer W to form a first laminated layer 60$a$ extending in one direction. In this case, a power (output) of light emitted by a first photo curing unit 100 may be adjusted to 5 mW. A viscosity of the first droplet on which the light emitted by the first photo curing unit 100 has been irradiated may be 10 cp, and a height of the first laminated layer 60$a$ may be 0.3 μm.

Then, the droplet ejector 30 may discharge second droplets having a second photo-curable material on the first laminated layer 60$a$ to form a second laminated layer 60$b$. In this case, the power (output) of light emitted by the first photo curing unit 100 may be adjusted to 10 mW. A viscosity of the second droplet on which the light emitted by the first photo curing unit 100 has been irradiated may be 15 cp, and a height of the second laminated layer 60$b$ may be 0.3 μm.

Then, the droplet ejector 30 may discharge third droplets having a third photo-curable material on the second laminated layer 60$b$ to form a third laminated layer 60$c$. In this case, the power (output) of light emitted by the first photo curing unit 100 may be adjusted to 15 mW. A viscosity of the third droplet on which the light emitted by the first photo curing unit 100 has been irradiated may be 15 cp, and a height of the third laminated layer 60$c$ may be 0.5 μm.

Then, the droplet ejector 30 may discharge fourth droplets having a fourth photo-curable material on the third laminated layer 60$c$ to form a fourth laminated layer 60$d$. In this case, the power (output) of light emitted by the first photo curing unit 100 may be adjusted to 20 mW. A viscosity of the third droplet on which the light emitted by the first photo curing unit 100 has been irradiated may be 15 cp, and a height of the second laminated layer 60$b$ may be 1.0 μm.

As mentioned above, the three-dimensional printing apparatus 10 may include the droplet ejector 30 that ejects the droplet 50 having a photo-curable material on the wafer W, and the first photo curing unit 100 as a preliminary photo curing unit configured to irradiate light to the droplet 50 ejected from the droplet ejector 30 and falling along the drop path. In addition, the three-dimensional printing apparatus 10 may further include the second photo curing unit 200 as a main photo curing unit configured to irradiate light onto the droplets that have landed on the wafer W.

The first photo curing unit 100 may include the output portion 136 of the optical fiber module 130 as the light emitting portion arranged between the droplet nozzle 32 and the wafer W so as to be adjacent to the droplet nozzle 32 of the droplet ejector 30. The optical fiber module 130 may include a plurality of optical fibers 131 that direct the light from the light source 110 toward the droplet 50 falling along the drop path. The output terminals of the optical fibers 131 may form the output portion 136 of the optical fiber module 130.

The output portion 136 of the optical fiber module 130 may have a rectangular or annular shape extending to surround the droplet nozzle 32 when viewed in plan view.

Accordingly, the output portion 136 may irradiate light to various sides of the droplet 50 discharged from the droplet nozzle 32.

Additionally, the output portion 136 of the optical fiber module 130 may include the first to third light emission channels 131a, 131b and 131c arranged in a vertical direction (Z direction). Each of the first to third light emission channels 131a, 131b and 131c may include the portions of the output terminals of the optical fibers 131. The position (height) of the droplet 50 to be irradiated by light while falling along the drop path may be determined by adjusting the irradiation timings of the first to third light emission channels 131a, 131b and 131c.

Thus, the height of the stacked layer, spreadability of the droplet, etc. may be adjusted according to the stacked layers of the microstructure formed on the wafer W, the physical properties of the droplet, etc.

Hereinafter, a method of forming a three-dimensional microstructure on a wafer using the above three-dimensional printing apparatus will be explained.

Figure 19:
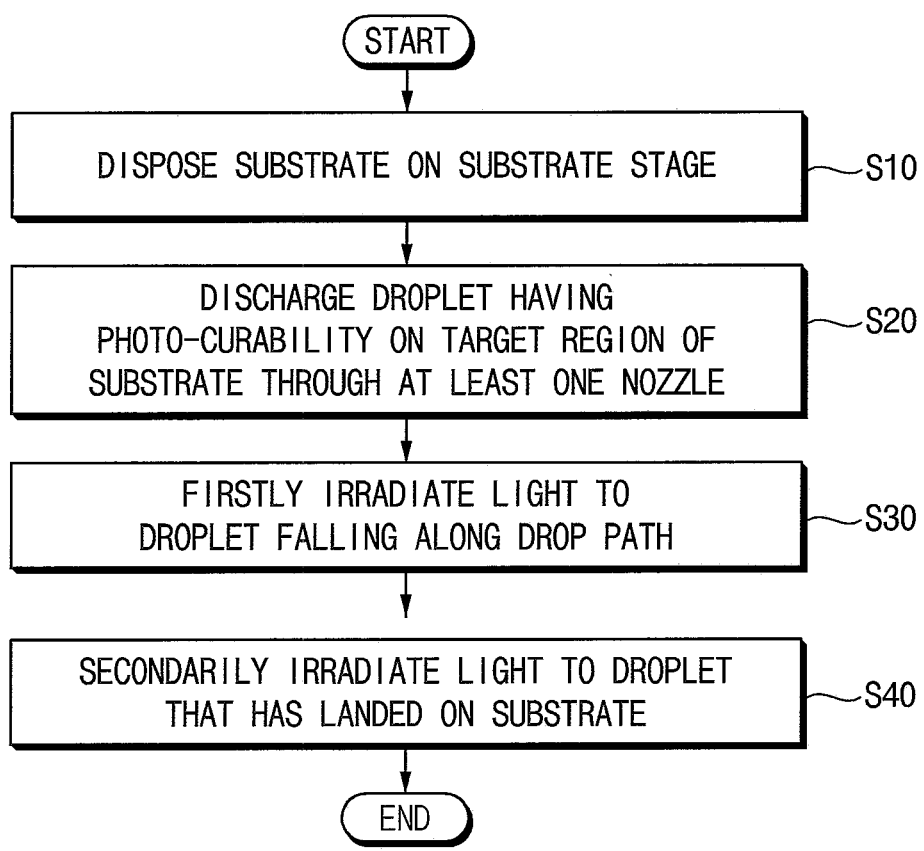

FIG. 19 is a flowchart illustrating a 3D printing method in accordance with example embodiments.

Referring to FIGS. 1 to 19, first, a substrate such as a wafer W may be disposed or positioned on a substrate stage 20 (S10), and a droplet 50 having photo-curability may be discharged or ejected toward a target area of the wafer W through at least one droplet nozzle 32 (S20).

In example embodiments, a controller 400 may control to move the substrate stage 20 on which the wafer W is disposed to a space under a droplet ejector 30, and then the droplet nozzle 32 of the droplet ejector 30 may eject the droplet 50 to the target area on the wafer W. For example, a gap G1 between the droplet nozzle 32 of the droplet ejector 30 and the wafer W may be within a range of 1 mm to 2 mm.

An inkjet head block 31 of the droplet ejector 30 may include first to third nozzle arrays 32a, 32b and 32c arranged in a second direction (Y direction) perpendicular to a first direction (X direction). The first to third nozzle arrays 32a, 32b and 32c may eject droplets 50 on the first to third regions R1, R2 and R3 spaced apart at regular intervals on the wafer W, respectively.

Then, a first photo curing unit 100 may firstly irradiate light to the droplet 50 falling along a drop path P to increase the viscosity of the droplet 50 (S30).

In example embodiments, as illustrated in FIG. 14, the droplet 50 discharged from the droplet nozzle 32 may fall along the drop path P and then land on the wafer W. A light emitting portion 136 of the first photo curing unit 100 may irradiate light L1 in a horizontal direction toward the droplet 50 that is falling along the drop path P between the droplet nozzle 32 and the wafer W before the droplet 50 hits the wafer W.

When a first time t1 has elapsed from a discharge time t0, the light emitting portion 136 of the first photo curing unit 100 may irradiate the droplet 50 with light. At this time, a diameter of the droplet 50 may be within the range of 15 μm to 40 μm. As light is irradiated to the droplet 50, the physical property of the droplet 50, that is, viscosity may increase. The rate of change in viscosity of the droplet 50 may be determined by the power (output) of the light.

Then, the droplet 50 having the increased viscosity by the light irradiation may land on a target area of the wafer W at a time point when a second time t2 has elapsed from the discharge time t0. The droplet 50i that has landed on the wafer W may spread on a surface of the wafer W. The spread of the impacted droplet 50i may be reduced by the increased viscosity so that the impacted droplet has a relatively small diameter D2. For example, the diameter D2 of the impacted droplet 50i may be 50 μm or less. A height H of the impacted droplet 50i may be 1 μm or less.

Then, a second photo curing unit 200 may secondarily irradiate light onto the droplet 50i that has landed on the wafer W to cure the droplet 50i (S40).

In example embodiments, as illustrated in FIGS. 15 and 16, while the wafer W moves in one direction, the droplet nozzle 32 may discharge the droplets 50 according to a pulse signal, thereby forming a microstructure having a constant width M.

After the droplet 50 discharged from the droplet nozzle 32 lands on the wafer W, the wafer W may move to a space under the second photo curing unit 200 by a stage driver and the second photo curing unit 200 may irradiate light to the droplet 50i that has landed on the wafer W. Accordingly, the impacted droplet 50i may be changed into a droplet 50f cured by light to form the microstructure. The microstructure may have a width M of 50 μm or less.

The above-described steps S10 to S40 may be repeatedly performed to sequentially form a plurality of stacked layers on the wafer W to form a desired three-dimensional microstructure.

For example, the 3D microstructure may include a plurality of support spacers disposed between stacked memory dies of a high bandwidth memory (HBM) device. The support spacer may be disposed in a peripheral region of the memory die to prevent over-pressing in an edge region in a pressurized reflow process. Since the support spacer is disposed adjacent to solder bumps, the support spacer may be required to have a relatively narrow line width so as not to interfere with the solder bumps. A width of the support spacer may be 50 μm or less, and a height of the support spacer may be within a range of 12 μm to 14 μm.

According to another example, the 3D microstructure may include a dam structure disposed on one surface of a redistribution wiring layer of a panel level package (PLP). The dam structure may be provided around LSC-type capacitor pads that are exposed from the surface of the redistribution wiring layer, to protect them from dielectric resin. A width of the dam structure may be 50 μm or less, and a height of the dam structure may be within a range of 20 μm to 30 μm.

The above three-dimensional printing method may be used for manufacturing a semiconductor package including semiconductor devices such as logic devices or memory devices. The semiconductor package may include logic devices such as central processing units (CPUs), main processing units (MPUs), or application processors (APs), or the like, and volatile memory devices such as DRAM devices, HBM devices, or non-volatile memory devices such as flash memory devices, PRAM devices, MRAM devices, ReRAM devices, or the like.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present disclosure. Accordingly, all such modifications are intended to be included within the scope of example embodiments as defined in the claims.

What is claimed is:

1. A 3D printing apparatus, comprising:
a substrate stage configured to support a substrate;
a droplet ejector comprising a plurality of droplet nozzles, each droplet nozzle in the plurality of droplet nozzles configured to discharge a photo-curable droplet on the substrate;
a first photo curing unit configured to irradiate light to a drop path along which the droplets discharged from the droplet nozzles fall, to change a viscosity of the droplets;
a second photo curing unit configured to irradiate light onto the droplets that have landed on the substrate, to cure the droplets; and
a controller configured to control an irradiation timing of light emitted from the first photo curing unit based on ejection signals of the droplets ejected from the droplet nozzles,
wherein the first photo curing unit comprises a plurality of light emission channels arranged in a vertical direction, the plurality of light emission channels comprising a first light emission channel at a first height from the substrate, a second light emission channel at a second height from the substrate, and a third light emission channel at a third height from the substrate,
the first height is greater than the second height and the second height is greater than the third height,
the controller is further configured to simultaneously control an irradiation timing of the light emitted from the first light emission channel, the second light emission channel, and the third light emission channel such that the first light emission channel irradiates a first droplet at the first height and at a first region that is a first distance from the first photo curing unit, the second light emission channel irradiates a second droplet at the second height and at a second region that is a second distance from the first photo curing unit, and the third light emission channel irradiates a third droplet at the third height and at a third region that is a third distance from the first photo curing unit, and
the first distance is less than the second distance and the second distance is less than the third distance.

2. The 3D printing apparatus of claim 1, wherein the droplet ejector comprises an inkjet head block with a plurality of inkjet nozzles installed therein, the plurality of inkjet nozzles being arranged in a first direction.

3. The 3D printing apparatus of claim 1, wherein the first photo curing unit comprises:
a light source configured to generate the light; and
an optical fiber module comprising a plurality of optical fibers that are configured to direct the light from the light source toward the drop path between the droplet nozzle and the substrate.

4. The 3D printing apparatus of claim 3, wherein the optical fiber module comprises a light emitting portion in which output terminals of the optical fibers are arranged in an array.

5. The 3D printing apparatus of claim 4, wherein the light emitting portion comprises the plurality of light emission channels arranged in the vertical direction.

6. The 3D printing apparatus of claim 4, wherein the light emitting portion has a polygonal or annular shape that surrounds the droplet nozzle.

7. The 3D printing apparatus of claim 4, wherein at least a portion of the light emitting portion is fixedly installed in or on an inkjet head block of the droplet ejector.

8. The 3D printing apparatus of claim 7, wherein a gap between the droplet nozzle and the substrate is within a range of 1 mm to 2 mm.

9. The 3D printing apparatus of claim 1, wherein the controller is configured to control an output of the light irradiated from the first photo curing unit.

10. A 3D printing apparatus, comprising:
a substrate stage configured to support a substrate;
an inkjet head comprising a plurality of droplet nozzles, each droplet nozzle in the plurality of droplet nozzles configured to discharge an ultraviolet (UV)-curable droplet on the substrate;
a first UV irradiator configured to irradiate UV light in a horizontal direction to a drop path along which the droplets discharged from the droplet nozzles fall, to change a viscosity of the droplets;
a second UV irradiator configured to irradiate UV light onto the droplets that have landed on the substrate, to cure the droplets; and
a controller configured to control an irradiation timing of the UV light emitted from the first UV irradiator based on ejection signals of the droplets ejected from the droplet nozzles,
wherein the first UV irradiator comprises a plurality of light emission channels arranged in a vertical direction, the plurality of light emission channels comprising a first light emission channel at a first height from the substrate, a second light emission channel at a second height from the substrate, and a third light emission channel at a third height from the substrate,
the first height is greater than the second height and the second height is greater than the third height,
the controller is further configured to simultaneously control an irradiation timing of the UV light emitted from the first light emission channel, the second light emission channel, and the third light emission channel such that the first light emission channel irradiates a first droplet at the first height and at a first region that is a first distance from the first UV irradiator, the second light emission channel irradiates a second droplet at the second height and at a second region that is a second distance from the first UV irradiator, and the third light emission channel irradiates a third droplet at the third height and at a third region that is a third distance from the first UV irradiator, and
the first distance is less than the second distance and the second distance is less than the third distance.

11. The 3D printing apparatus of claim 10, wherein the inkjet head comprises an inkjet head block with a plurality of inkjet nozzles installed therein, the plurality of inkjet nozzles being arranged in a first direction.

12. The 3D printing apparatus of claim 11, wherein the first UV irradiator comprises:
a light source configured to generate the UV light; and
an optical fiber module comprising a plurality of optical fibers that are configured to direct the UV light from the light source toward the drop path between the droplet nozzle and the substrate.

13. The 3D printing apparatus of claim 12, wherein the optical fiber module comprises a light emitting portion in which output terminals of the optical fibers are arranged in an array.

14. The 3D printing apparatus of claim 13, wherein the light emitting portion comprises the plurality of light emission channels arranged in the vertical direction.

15. The 3D printing apparatus of claim 13, wherein the light emitting portion has a polygonal or annular shape that surrounds the droplet nozzle.

16. The 3D printing apparatus of claim 13, wherein at least a portion of the light emitting portion is fixedly installed in or on the inkjet head block.

17. The 3D printing apparatus of claim 10, wherein a gap between the droplet nozzle and the substrate is within a range of 1 mm to 2 mm.

18. The 3D printing apparatus of claim 10, wherein the controller is configured to control an output of the UV light irradiated from the first UV irradiator.

19. A 3D printing apparatus, comprising:
- a substrate stage configured to support a substrate;
- a droplet ejector comprising a plurality of droplet nozzles, each droplet nozzle in the plurality of droplet nozzles configured to discharge a photo-curable droplet on the substrate;
- a first photo curing unit configured to irradiate light in a horizontal direction to a drop path along which the droplets discharged from the droplet nozzles fall, to change a viscosity of the droplets;
- a second photo curing unit configured to irradiate light onto the droplets that have landed on the substrate, to cure the droplets; and
- a controller configured to control an irradiation timing of light emitted from the first photo curing unit based on ejection signals of the droplets ejected from the droplet nozzles,
- wherein the first photo curing unit is configured to irradiate the light to different sides of the droplets falling along the drop path,
- wherein the first photo curing unit comprises an optical fiber module comprising a plurality of optical fibers and an output portion housing surrounding output terminals of the optical fibers,
- wherein the output portion housing has a polygonal shape that surrounds the droplet nozzles,
- wherein the output portion housing comprises first and second spaced apart emitting portions extending in a first direction and facing each other, and third and fourth spaced apart emitting portions extending in a second direction perpendicular to the first direction and facing each other,
- wherein the output terminals of the optical fibers comprise a plurality of light emission channels arranged in a vertical direction, the plurality of light emission channels comprising a first light emission channel at a first height from the substrate, a second light emission channel at a second height from the substrate, and a third light emission channel at a third height from the substrate,
- the first height is greater than the second height and the second height is greater than the third height, and
- the controller is further configured to simultaneously control an irradiation timing of the light emitted from the first light emission channel, the second light emission channel, and the third light emission channel such that the first light emission channel irradiates a first droplet at the first height, the second light emission channel irradiates a second droplet at the second height, and the third light emission channel irradiates a third droplet at the third height.

* * * * *